(12) United States Patent
Fadida et al.

(10) Patent No.: US 8,959,623 B2
(45) Date of Patent: Feb. 17, 2015

(54) PROTECTING VIRTUAL MACHINE CONSOLE FROM MISUSE, HIJACKING OR EAVESDROPPING IN CLOUD ENVIRONMENTS

(75) Inventors: Itzhak Fadida, Haifa (IL); Nir Barak, Karmi Yosef (IL); Alex Korthny, Pardes-Hana (IL); Guy Balzam, Raanana (IL)

(73) Assignee: CA, Inc., New York, NY (US)

( * ) Notice: Subject to any disclaimer, the term of this patent is extended or adjusted under 35 U.S.C. 154(b) by 435 days.

(21) Appl. No.: 13/481,055

(22) Filed: May 25, 2012

(65) Prior Publication Data

US 2013/0318599 A1 Nov. 28, 2013

(51) Int. Cl.
*G06F 7/04* (2006.01)
*G06F 21/00* (2013.01)

(52) U.S. Cl.
USPC ............................................. 726/21; 713/183

(58) Field of Classification Search
CPC ................. H04L 63/0272; G06F 2009/45579; G06F 9/45533
USPC .................. 726/7, 19, 21; 713/168, 172, 183; 709/204, 225
See application file for complete search history.

(56) References Cited

U.S. PATENT DOCUMENTS

| 4,942,606 | A  | * | 7/1990  | Kaiser et al. ...................... 726/19 |
| 8,452,904 | B2 | * | 5/2013  | Takebe et al. ..................... 710/62 |
| 8,595,806 | B1 | * | 11/2013 | Gabrielson ......................... 726/7 |
| 2007/0033413 | A1 | * | 2/2007  | Terrell et al. ................... 713/183 |
| 2007/0079308 | A1 |   | 4/2007  | Chiaramonte et al. |
| 2010/0037296 | A1 |   | 2/2010  | Silverstone |
| 2010/0050170 | A1 | * | 2/2010  | Parikh et al. ...................... 718/1 |
| 2010/0138208 | A1 | * | 6/2010  | Hattori et al. .................... 703/25 |
| 2011/0016467 | A1 |   | 1/2011  | Kane |
| 2011/0072486 | A1 |   | 3/2011  | Hadar et al. |
| 2011/0161482 | A1 |   | 6/2011  | Bonola et al. |
| 2011/0314468 | A1 | * | 12/2011 | Zhou et al. ........................ 718/1 |
| 2012/0023507 | A1 | * | 1/2012  | Travis ............................ 719/319 |
| 2012/0096271 | A1 | * | 4/2012  | Ramarathinam et al. ..... 713/172 |
| 2012/0246478 | A1 | * | 9/2012  | Nakae et al. ................... 713/168 |

OTHER PUBLICATIONS

Petri, D. "Remote Vendor Monitoring: How to Record All Remote Access (via SSL VPN Gateway Sessions)" An ObserveIT Whitepaper Mar. 2008.
Plisko, C. "Options for User Auditing on Linux and Solaris Platforms" Whitepaper, www.observeit.com Jan. 2012.

(Continued)

*Primary Examiner* — Dede Zecher
*Assistant Examiner* — Abdullah Almamun
(74) *Attorney, Agent, or Firm* — Myers Bigel Sibley & Sajovec, P.A.

(57) ABSTRACT

Access to virtual machine inputs and outputs are controlled. Controlling access to virtual machine inputs and outputs may comprise locking inputs and outputs of a virtual machine from within the virtual machine, other than a predefined limited access input, detecting a request to unlock the inputs and outputs of the virtual machine; determining if a requester is authorized to unlock the inputs and outputs of the virtual machine and unlocking, temporarily, the inputs and outputs of the virtual machine if the requester is authorized. The predefined limited access input is configured to receive an input device with a private secret for unlocking the inputs and outputs of the virtual machine. The inputs and outputs are unlocked when an input device having a shared password is attached.

15 Claims, 3 Drawing Sheets

(56) References Cited

OTHER PUBLICATIONS

People Auditing: Why Are We Ignoring the #1 Cause of Downtime and Security Breaches A Troubleshooting Process Whitepaper, observeit-sys.com Mar. 2008.

Petri, D. "Remote Vendor Monitoring: How to Record All Remote Access (via SSL VPN Gateway Sessions)" An ObserveIT Whitepaper Mar. 2008.

* cited by examiner

PROTECTING VIRTUAL MACHINE CONSOLE FROM MISUSE, HIJACKING OR EAVESDROPPING IN CLOUD ENVIRONMENTS

BACKGROUND

Aspects of the present disclosure are related to the field of virtual machines and more particularly to controlling access to inputs and outputs of the virtual machine.

Cloud computing and virtual machines (VM) are used by enterprises to access software applications and perform a wide variety of computing functions. Management and security issues are important concerns in the virtual machine environment. The problem is exacerbated because virtualization environment administrators are usually not the VM owners; therefore, they can get access to VM consoles they do not own. When a customer receives a VM in a cloud, the VM console can be accessed by the virtualized environment administrators, potentially exposing data for access from the virtualized environment management system.

Further, while using the VM console in a shared virtualization environment, someone may view everything done on a console. For example, when the VM owner uses a console, someone may open it, view the console and potentially can alter the data. Moreover, someone with access to the virtualization environment can directly open and work on the VM console.

BRIEF SUMMARY

Disclosed is a method for controlling access to virtual machine inputs and outputs comprising locking inputs and outputs of a virtual machine from within the virtual machine, other than a predefined limited access input, detecting a request to unlock the inputs and outputs of the virtual machine, determining if a requester is authorized to unlock the inputs and outputs of the virtual machine; and unlocking, temporarily, the inputs and outputs of the virtual machine if the requester is authorized. The predefined limited access input is configured to receive an input device with a private secret for unlocking the inputs and outputs of the virtual machine.

Also disclosed is method for controlling access to virtual machine inputs and outputs comprising providing a list of configurable inputs and outputs for a virtual machine to a virtual machine owner to determine access rights, receiving selections from the list of configurable inputs and outputs, from the virtual machine owner, one selection is a limited access input and another selection is an input and an output which is to remain unlocked, locking, inputs and outputs of the virtual machine from within the virtual machine, other than the limited access input and the selected input and output, detecting a request to unlock the inputs and outputs of the virtual machine, determining if a requester is authorized to unlock the inputs and outputs of the virtual machine, and unlocking, temporarily, the inputs and outputs of the virtual machine if the requester is authorized. The limited access input is configured to receive an input device with a private secret for unlocking the inputs and outputs of the virtual machine Also disclosed is computer program product. The computer program product comprises a computer readable storage medium having computer readable program code embodied therewith. The computer readable program code comprises computer readable program code configured to lock inputs and outputs of a virtual machine, other than a limited access input from within the virtual machine, to detect a request to unlock the inputs and outputs of the virtual machine; to determine if a requester is authorized to unlock the inputs and outputs of the virtual machine; and to unlock, temporarily, the inputs and outputs of the virtual machine if the requester is authorized. The limited access input is configured to receive an input device with a private secret for unlocking the inputs and outputs of the virtual machine.

Also disclosed is computer program product. The computer program product comprises a computer readable storage medium having computer readable program code embodied therewith. The computer readable program code comprises computer readable program code configured to provide a list of configurable inputs and outputs for a virtual machine to a virtual machine owner to determine access rights, to receive selections from the list of configurable inputs and outputs, from the virtual machine owner, one selection is a limited access input and another selection is an input and an output which is to remain unlocked, to lock, inputs and outputs of the virtual machine from within the virtual machine, other than the limited access input and the selected input and output, to detect a request to unlock the inputs and outputs of the virtual machine, to determine if a requester is authorized to unlock the inputs and outputs of the virtual machine; and to unlock, temporarily, the inputs and outputs of the virtual machine if the requester is authorized. The limited access input is configured to receive an input device with a private secret for unlocking the inputs and outputs of the virtual machine

DETAILED DESCRIPTION

Figure 1:
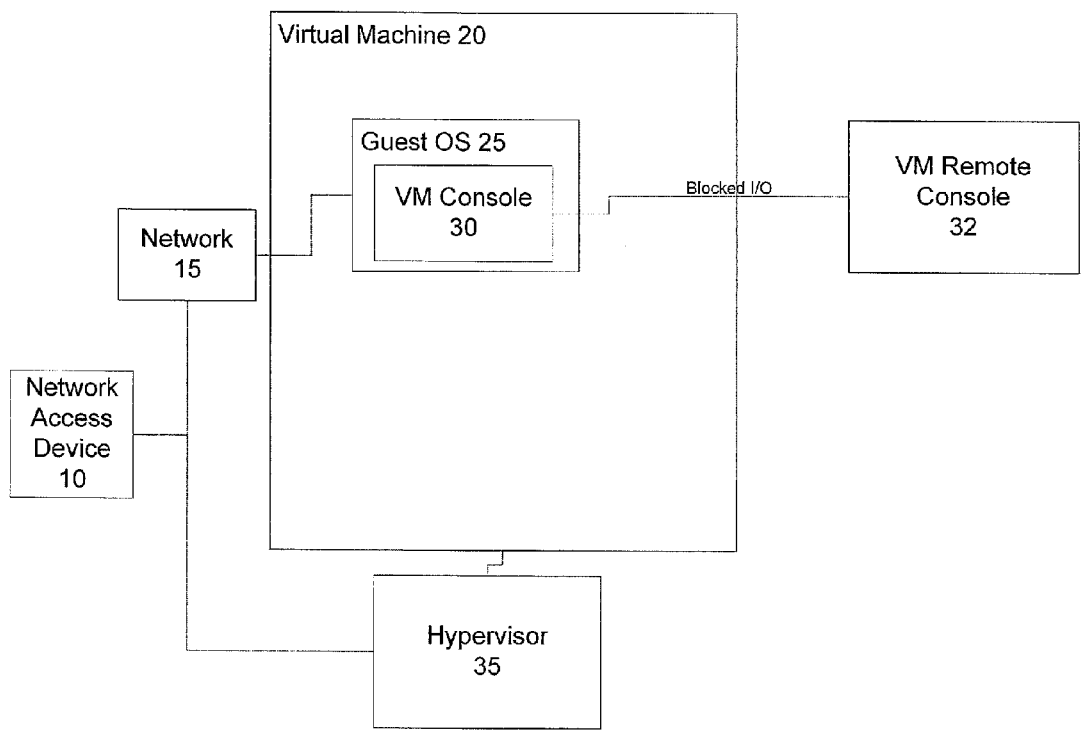
FIG. 1 is a diagram that illustrates a virtual machine having blocked inputs and outputs in accordance with an aspect of the disclosure.

FIG. 1 is a diagram that illustrates a virtual machine 20 ("VM") having blocked inputs and outputs in accordance with an aspect of the disclosure. While using a virtual machine 20 in a shared virtualization environments (not shown), the VM 20 should only be connected to a trusted environment, however, a virtual machine console 30 ("VM console") can still be accessed from a virtualization environment management allowing access to the VM console 30 by persons other than a VM owner, and from it to the VM itself, breaking the boundary between the VM 30 and a hosting environment. A virtualization environment or a hosting environment provides the VM 20 with resources and capabilities to run. A VM console 30 is a window that allows a user to interact directly with the VM 20.

In accordance with aspects of this disclosure, a blocking module, such as a software application, in the guest OS 25, blocks the inputs and outputs ("I/O") of the VM 20. In accordance with an aspect of the disclosure, the software application can disable drivers or refuse inputs and outputs. For example, a screen saver that does allow the reception of inputs and is configured to display non-information data (not related to the VM) can be used. The inputs from a mouse and keyboard are effectively blocked.

However, an owner during a configuration process, which will be described in detail with respect to FIG. 3, can define an I/O that remains unblocked or unlocked. Typically, an unblocked I/O is a remote network connection. The network connection (network 15) can be secured. For example, remote access to the VM 20 can be achieved via Secure Shell (SSH) or Remote Desktop Protocol (RDP). Additionally, network access 15 via a network access device 10 can be controlled using network segregation, firewalls, and local access control on a VM 20. By accessing the VM 20 remotely, the owner will have access to the VM 20, but no party, from within the virtualization environment, will be able to access the VM 20, i.e., from the VM console 30 itself.

Additionally, a VM owner can define an I/O that will remain unblocked for accessing a VM 20 during an emergency (hereinafter a "limited access I/O"). The guest OS 25 monitors the limited access I/O for an input device (not shown) that will signal the guest OS 25 to reactivate the VM 20 by unlocking any locked I/Os. The input device must have a predefined secret. The predefined secret is a word, number, phrase, image or file that a VM owner only knows. For example, the input device can be an ISO file with the predefined secret. The input device can be attached externally to the VM 20. In an aspect of the disclosure, the input device is indirectly "attached" to the VM 20 via the network 15 and the hypervisor 35, e.g., a virtual machine manager. The predefined secret is set up during the configuration process which will be described in detail with respect to FIG. 3.

By blocking I/Os, access to the VM 20 is limited and the VM 20 is secured. A virtualization environment provider or manager will not be able to access the VM 20 or VM console 30.

Once, an problem is resolved, the input device is removed and the guest OS 25 causes the I/Os to be relocked.

Figure 2:
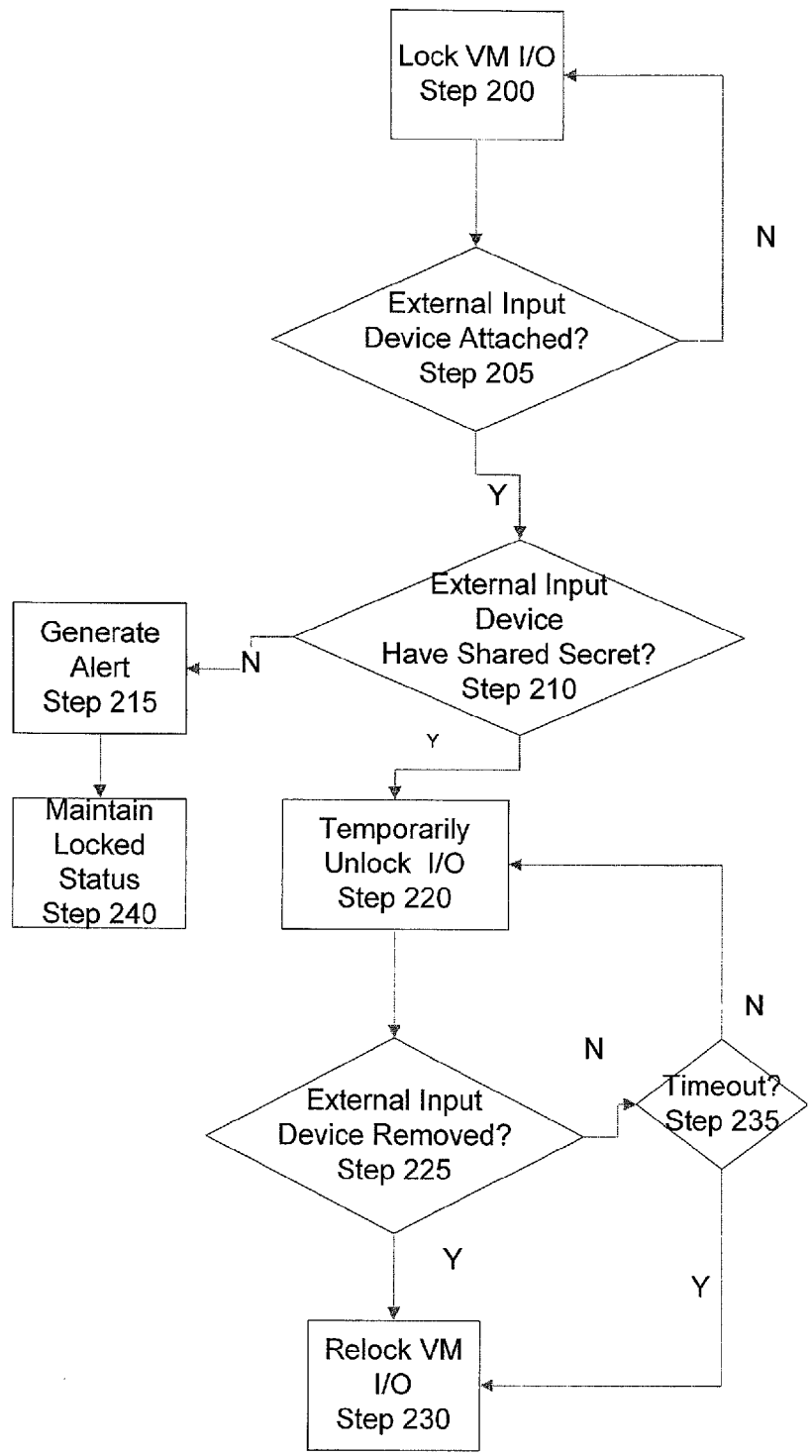
FIG. 2 is a flow chart illustrates an example of a method of securing a virtual machine in accordance with an aspect of the disclosure.

A method of securing a virtual machine in accordance with an aspect of the disclosure will be described with respect to FIGS. 1 and 2. At step 200, the I/Os of the VM 20 are locked. Specifically, any I/O not predefined as the limited access I/O or a preset unblocked I/O is locked. Any I/O calls are intercepted by the guest OS 25 and blocked. Thus, if anyone attempts to access the VM console 30, the VM console 30 will open, but will be blank. As depicted in FIG. 1, the connection between the VM console 30 and the VM Remote Console 32 is blocked.

During this time, access to the VM 20 is limited to the unlocked I/O. The owner can use remote access for regular work with the VM 20. FIG. 1 illustrates a network access device 10 having access to the guest OS 25 via the network 15. The network access device 10 can be any device configured for wired or wireless communication, including but not limited to, a personal computer, a workstation, a desktop, a laptop, a smartphone, and a PDA.

The guest OS 25 continuously monitors the predefined limited access I/O for an input device having the predefined secret. The guest OS 25 is configured to interact with the hypervisor 35. The hypervisor 35 will push any file received through a remote access via network 15 to the guest OS 25. FIG. 1 illustrates a network connection from a network access device 10 to the hypervisor 35 via the network 15. Access to the hypervisor 35 is through a dedicated network address for the hypervisor 35. At decision step 205, the guest OS 25 determines if an input device has been attached. If no input device is attached ("N" at decision step 205), the I/O(s) remain locked (returns to step 200).

If the guest OS 25 determines that an input device is attached ("Y" at decision step 205), the guest OS 25 then determines if the input device has the shared predefined secret at decision step 210. The guest OS 25 extracts the data from the input device. For example, if the input device includes an ISO file, the guest OS 25 extracts the ISO image. Additionally, the guest OS 25 retrieves the predefined secret from its internal storage area (not shown). The two are compared. If the two match, the guest OS 25 temporarily unlocked the I/O(s) at step 220. For example, the blocking module stops intercepting the I/O calls from the guest OS 25.

If the two are different, the guest OS 25 generates an alert to the owner at step 215. The notification (alert) can be an email sent to the owner's email address indicating an improper attempted access to the VM 20 and the VM console 30. However, the notification is not limited to an email. The notification can also be an automated telephone call to a registered telephone number. Additionally, the notification can be a text message sent to a registered device. The notification can include a default alert message. The default alert message can be a basic alert. In another aspect of the disclosure, a customized alert can be sent, which can be set during the configuration process. For example, an owner can define the formatting and the information sent in the notification, including but not limited to, the time of the "breach", the date, the name of the VM, and the information contained in the input device.

The notification means, i.e. email, text or telephone call, can also be preset during the configuration process. Furthermore, the owner can register a notification device to receive the notification.

When the two are different at step 240, the guest OS 25 maintains the I/Os locked. Once unlocked, the VM console 30 (VM Remote console) 32 can be directly accessed. The owner would unlock the VM console 30, 32 to fix a major failure that can only be fixed from direct access to the VM console 30, 32. For example, if the remote access to the VM 20 fails, the owner can access the VM directly through the VM console 30, 32. Additionally, certain guest OS 25 malfunctions cannot be fixed through remote access. Further, if the network needs to be reconfigured direct access is required. Additionally, if the OS is being run on a limitation level for maintenance, such as when a drive is damages), direct access might be needed.

When the failure has been fixed or when the owner no longer needs direct access to the VM console 30, 32, the owner will remove the input device from the predefined limited access I/O.

As described above, the guest OS 25 continuously monitors the predefined limited access I/O for an input device having a predefined secret. The guest OS 25 also continuously monitors the predefined limited access I/O for the removal of the input device. At decision step 225, the guest OS 25 determines if the input device has been removed from the predefined limited access I/O.

If the input device is determined to have been removed ("Y" at decision step 225), the guest OS 25 relocks the I/Os at step 230. Any I/O not predefined as the limited access I/O or the preset unblock I/O is relocked, i.e., the same I/Os are locked. Once again, any I/O calls are intercepted by the guest OS 25 and blocked.

If the input device is still "attached" to the predefined limited access I/O, the I/Os remain unlocked. Additionally, the guest OS 25 monitors the VM consoles 30, 32 for activity. If no activity is detected for a predetermined time, even if the input device is still attached, the guest OS 25 can relock the I/Os. The predetermined time can be determined by the owner during the configuration process. Additionally, the owner can determine, during the configuration process, whether to activate or deactivate this additional security feature.

The guest OS 25 can include an image processing section or module that is configured to analyze an image of the VM consoles 30, 32. Additionally, the guest OS 25 can include a timing section or module for tracking the time between changes in the image. The image processing section and timing section are further configured to communicate with each other.

In another aspect of the disclosure, each time the image processing section detects a change in the image, a signal is transmitted to the timing section. When a first signal is received by the timing section, it is set to a predetermined time. The timing section is then started and counts down to zero, starting from the set predetermined time. Each subsequent signal causes the timing section to reset the time to the predetermined time.

If the value indicated by the timing section reaches zero ("Y" at decision step 235), e.g., expires, the guest OS relocks the I/Os at step 230. If the value indicated by the timing section is greater than zero ("N" at decision step 235), e.g., not expired, the I/O remain unlocked (step 220).

Figure 3:
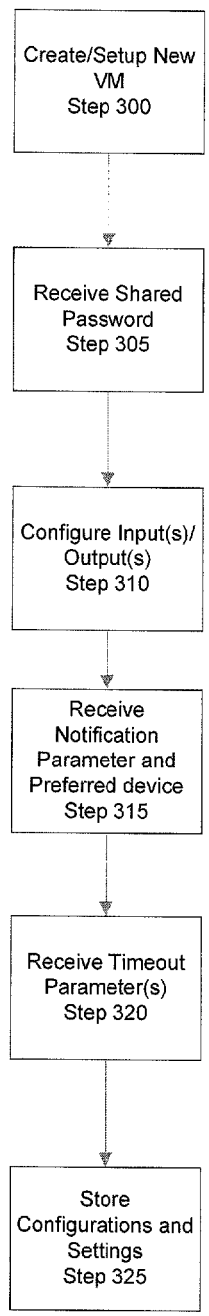
FIG. 3 is a flow chart illustrates an example of a method for configuring security features for a virtual machine in accordance with an aspect of the disclosure.

FIG. 3 illustrates an example of a method for configuring security features for a virtual machine in accordance with an aspect of the disclosure. At step 300, the VM 20 is created and registered with the virtualization environment. The creation of a VM 20 is well known and will not be described herein in detail. At step 305, the owner security password (shared secret) is set up. The guest OS 25 prompts the owner to enter the shared password. The owner can configure the VM 20 using the network access device 10 via the network 15. In response, to the prompting, the owner defines the shared password. The owner can type the shared password or input the shared password in any other known manner including uploading a file, image or picture through one of the inputs. The shared password can be any identifier, file, word, number, picture, etc. unique to the owner. The shared password must be maintained secret. In an aspect of the disclosure, prior to storage, the shared password is encrypted.

At step 310, the I/Os are configured. In particular, the guest OS 25 displays a list of available I/O to the owner. For each I/O, the owner selects whether to lock and block access or leave open, unlocked. Additionally, one of the available I/O is selected as the limited access I/O. The limited access I/O is typically an I/O to/from the hypervisor 35. Once the selection is received, the guest OS 25 defines the selected I/O as the limited access I/O and the guest OS 25 is configured to monitor the selected I/O. If no selection is made, the default is that all I/Os except a limited access I/O is locked. The default limited access I/O is the I/O to/from the hypervisor 35.

At step 315, the owner can enable or disable the feature of a remote notification if an incorrect password is received via the limited access I/O using an input device. If no selection is made, the default is that the feature is disabled. If enabled, the owner can register devices to receive the notification. Additionally, the owner can determine how it wants to receive the notification, e.g., email, text, or voicemail. The owner enters the associated address or identifier for the notification form such as, but not limited to, a telephone number, IP address or email address.

At step 320, the owner can enable or disable the VM console timeout feature. If no selection is made, the default is that the feature is disabled. If enabled, the owner inputs a predetermined time which is used as a time threshold to relock the I/Os.

The configuration information is stored (step 325). The VM owner has exclusive access to the configuration information and the virtualization environment provider will not have access. While FIG. 3 depicts that the setting and configuration information is stored after all of the setting and configurations are enter, however, the information can be stored after each step. The configuration information is stored as a configuration file. The information is accessed by the blocking unit, e.g., software application.

As will be appreciated by one skilled in the art, aspects of the present disclosure may be embodied as a system, method or computer program product.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "device," "OS", "I/O", "interface" "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The ten is "device," "OS", "I/O", "interface" "module," "component," or "system." as may be used in the present disclosure may include a variety of combinations of fixed and/or portable computer hardware, software, peripherals, and storage devices. The system may include a plurality of individual components that are networked or otherwise linked to perform collaboratively, or may include one or more stand-alone components. The hardware and software components of the computer system of the present application may include and may be included within fixed and portable devices such as desktop, laptop, and/or server, and network of servers (cloud).

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method for controlling access to virtual machine inputs and outputs comprising:
   providing a list of configurable inputs and outputs for a virtual machine to a virtual machine owner to determine access rights;
   receiving selections from the list of configurable inputs and outputs, from the virtual machine owner, one selection being a limited access input and another selection being an input and an output which is to remain unlocked;
   locking inputs and outputs of a virtual machine from within the virtual machine, other than the limited access input and the selected input and output, the limited access input being configured to receive an input device with a private secret for unlocking the inputs and outputs of the virtual machine;
   detecting a request to unlock the inputs and outputs of the virtual machine;
   determining if a requester is authorized to unlock the inputs and outputs of the virtual machine; and
   unlocking, temporarily, the inputs and outputs of the virtual machine if the requester is authorized.

2. The method for controlling access to virtual machine inputs and outputs according to claim 1 further comprising:
   registering at least one owner of the virtual machine, the registering comprising receiving the selection of the limited access input; and
   receiving the private secret for temporarily unlocking the inputs and outputs of the virtual machine.

3. The method for controlling access to virtual machine inputs and outputs according to claim 2, wherein the detecting comprises determining if an input device is attached to the limited access input.

4. The method for controlling access to virtual machine inputs and outputs according to claim 3, wherein the determining comprises comparing data in the input device with the private secret, wherein if a match is determined, the inputs and outputs are unlocked.

5. The method for controlling access to virtual machine inputs and outputs according to claim 3, wherein the input device includes an ISO image.

6. The method for controlling access to virtual machine inputs and outputs according to claim 1, further comprising:
   relocking inputs and outputs of the virtual machine from within the virtual machine.

7. The method for controlling access to virtual machine inputs and outputs according to claim 6, further comprising:
   determining if the input device is detached from the limited access input.

8. The method for controlling access to virtual machine inputs and outputs according to claim 6, further comprising detecting usage of a virtual machine console, wherein if usage is not detected for a period of time, the inputs and outputs of the virtual machine are relocked.

9. A computer program product comprising:
a non-transitory computer readable storage medium having computer readable program code embodied therewith, the computer readable program code comprising:
computer readable program code configured to provide a list of configurable inputs and outputs for a virtual machine to a virtual machine owner to determine access rights;
computer readable program code configured to receive selections from the list of configurable inputs and outputs, from the virtual machine owner, one selection being a limited access input and another selection being an input and an output which is to remain unlocked;
computer readable program code configured to lock inputs and outputs of a virtual machine, other than the limited access input and the selected input and output, the limited access input being configured to receive an input device with a private secret for unlocking the inputs and outputs of the virtual machine;
computer readable program code configured to detect a request to unlock the inputs and outputs of the virtual machine;
computer readable program code configured to determine if a requester is authorized to unlock the inputs and outputs of the virtual machine; and
computer readable program code configured to unlock, temporarily, the inputs and outputs of the virtual machine if the requester is authorized.

10. The computer readable storage device according to claim 9, wherein the computer readable program code further comprises:
computer readable program code configured to determine if an input device is attached to the limited access input.

11. The computer readable storage device according to claim 10, wherein the computer readable program code further comprises:
computer readable program code configured to compare data in the input device with the private secret, wherein if a match is determined, the inputs and outputs are unlocked.

12. The computer readable storage device according to claim 9, wherein the computer readable program code further comprises:
computer readable program code configured to relock inputs and outputs of the virtual machine from within a virtual machine.

13. The computer readable storage device according to claim 12, wherein the computer readable program code further comprises:
computer readable program code configured to determine if the input device is detached from the limited access input.

14. The computer readable storage device according to claim 12, wherein the computer readable program code further comprises:
computer readable program code configured to detect usage of a virtual machine console, wherein if usage is not detected for a period of time, the inputs and outputs of the virtual machine are relocked.

15. A computer program product comprising:
a non-transitory computer readable storage medium having computer readable program code embodied therewith, the computer readable program code comprising:
computer readable program code configured to provide a list of configurable inputs and outputs for a virtual machine to a virtual machine owner to determine access rights;
computer readable program code configured to receive selections from the list of configurable inputs and outputs, from the virtual machine owner, one selection being a limited access input and another selection being an input and an output which is to remain unlocked;
computer readable program code configured to lock, inputs and outputs of the virtual machine from within the virtual machine, other than the limited access input and the selected input and output, the limited access input being configured to receive an input device with a private secret for unlocking the inputs and outputs of the virtual machine;
computer readable program code configured to detect a request to unlock the inputs and outputs of the virtual machine;
computer readable program code configured to determine if a requester is authorized to unlock the inputs and outputs of the virtual machine; and
computer readable program code configured to unlock, temporarily, the inputs and outputs of the virtual machine if the requester is authorized.

* * * * *